(12) United States Patent
Seidl et al.

(10) Patent No.: US 12,539,659 B2
(45) Date of Patent: Feb. 3, 2026

(54) HEATING OVEN AND METHOD OF USE

(71) Applicant: Discma AG, Hünenberg (CH)

(72) Inventors: Edward Seidl, Lathrup Village, MI (US); Richard Sieradzki, Novi, MI (US)

(73) Assignee: DISCMA AG, Hünenberg (CH)

( * ) Notice: Subject to any disclaimer, the term of this patent is extended or adjusted under 35 U.S.C. 154(b) by 228 days.

(21) Appl. No.: 17/999,453

(22) PCT Filed: Jun. 25, 2021

(86) PCT No.: PCT/IB2021/055705
§ 371 (c)(1),
(2) Date: Nov. 21, 2022

(87) PCT Pub. No.: WO2021/260651
PCT Pub. Date: Dec. 30, 2021

(65) Prior Publication Data
US 2023/0219278 A1    Jul. 13, 2023

Related U.S. Application Data

(60) Provisional application No. 63/043,856, filed on Jun. 25, 2020.

(51) Int. Cl.
*B29C 49/42* (2006.01)
*B29C 49/00* (2006.01)
(Continued)

(52) U.S. Cl.
CPC .... *B29C 49/42073* (2022.05); *B29C 49/0062* (2022.05); *B29C 49/42065* (2022.05);
(Continued)

(58) Field of Classification Search
CPC ............... B29C 48/68; B29C 49/0062; B29C 49/42095; B29C 49/006; B29C 49/0064
See application file for complete search history.

(56) References Cited

U.S. PATENT DOCUMENTS

| | | | | |
|---|---|---|---|---|
| 4,432,720 A | * | 2/1984 | Wiatt | B29C 49/28 425/534 |
| 9,283,709 B2 | | 3/2016 | Lindner et al. | |

(Continued)

FOREIGN PATENT DOCUMENTS

| | | |
|---|---|---|
| CN | 104369353 A | 2/2015 |
| CN | 107662329 A | 2/2018 |

(Continued)

OTHER PUBLICATIONS

FR-3035650-A1 EPO translation with paragraph numbers annotated in (Year: 2016).*

*Primary Examiner* — Joseph S Del Sole
(74) *Attorney, Agent, or Firm* — Michael E. Dockins; Shumaker, Loop & Kendrick, LLP

(57) ABSTRACT

Ways to produce a plurality of preform (5) temperature profiles are provided that employ systems having a first heating means, a second heating means, and a first transfer means. The a first heating means has a first preform (5) path, imparts a first temperature profile to a preform (5) passing through the first preform (5) path, and has a first dispensing means configured to selectively dispense the preform (5) passing through at least a portion of the first preform (5) path. The second heating means has a second preform (5) path, imparts a second temperature profile to a preform (5) passing through the second preform (5) path, and has a second dispensing means configured to selectively dispense the preform (5) passing through at least a portion of the second preform (5) path. The first transfer means selectively transfers a preform (5) between the first preform (5) path and the second preform (5) path.

10 Claims, 3 Drawing Sheets

(51) Int. Cl.
  *B29C 49/02* (2006.01)
  *B29C 49/06* (2006.01)
  *B29C 49/68* (2006.01)
  *B29L 31/00* (2006.01)

(52) U.S. Cl.
  CPC .. *B29C 49/42095* (2022.05); *B29C 49/42101* (2022.05); *B29C 49/42111* (2022.05); *B29C 49/682* (2022.05); *B29C 2049/024* (2013.01); *B29C 49/06* (2013.01); *B29C 2949/0715* (2022.05); *B29L 2031/712* (2013.01)

(56) References Cited

U.S. PATENT DOCUMENTS

| | | |
|---|---|---|
| 10,493,686 B2 | 12/2019 | Derrien |
| 2015/0079220 A1 | 3/2015 | Lindner et al. |

FOREIGN PATENT DOCUMENTS

| | | | | |
|---|---|---|---|---|
| CN | 108373022 A | 8/2018 | | |
| CN | 110869185 A | 3/2020 | | |
| DE | 202018106385 U1 | 2/2020 | | |
| EP | 1362804 A1 | 11/2003 | | |
| FR | 3035650 A1 * | 11/2016 | ......... | B29C 49/4205 |

* cited by examiner

HEATING OVEN AND METHOD OF USE

CROSS-REFERENCE TO RELATED APPLICATION

This patent application claims priority to U.S. Provisional Patent Application Ser. No. 63/043,856, filed on Jun. 25, 2020, the entire disclosure of which is hereby incorporated herein by reference.

FIELD

The present technology relates to systems and processes for producing a plurality of preforms having a plurality of temperature profiles, including where such preforms can be subjected to blow molding processes.

INTRODUCTION

This section provides background information related to the present disclosure which is not necessarily prior art.

Various products are distributed in plastic containers, such as containers formed from one or more polymers. Common polymers used to form containers include polyesters, such as polyethylene terephthalate (PET), high and low density polyethylenes (PE), polypropylenes (PP), and polycarbonates (PC), among others. Plastic containers can be made using various blow molding processes including injection blow molding, liquid or hydraulic blow molding, and extrusion blow molding, where such blow molding processes can employ a preform that is expanded by a fluid to form a resultant container.

Injection blow molding can be used to form certain plastic containers in one or more stages and can include use of a stretch rod. In a two-stage injection stretch blow molding process, a polymer can be first molded into a preform using an injection molding process. The preform can include the neck and finish of the container to be formed, which can include threading thereon, and a closed distal end. The preform can then be heated above the polymer glass transition temperature, optionally stretched longitudinally with a stretch rod, and blown using high-pressure gas (e.g., air) into a container conforming to a mold. As the preform is inflated, it elongates and stretches, taking on the shape of the mold cavity. The polymer solidifies upon contacting the cooler surface of the mold and the finished hollow container is subsequently ejected from the mold.

Liquid or hydraulic blow molding can form and fill a container in a single operation. A liquid product can be used to form and fill a polymeric preform within a mold into a resultant container, where the liquid product remains thereafter in the finished container. A heated preform, much like the preform used in injection blow molding, can be placed within the mold, optionally stretched, and rapidly filled using a liquid product instead of a gas to form a container therefrom. Combinations of the forming and filling steps can therefore optimize packaging of a liquid product by eliminating the transport of empty containers and time demands related to subsequent filling operations.

Various types of preforms can be used in such blow molding processes. Certain embodiments of preforms include injection-molded, rotationally or axially symmetric preforms that have an elongated, cylindrical, lateral body section, a rounded, closed bottom, and a neck section with an upper opening. Positioned proximate to the opening, there can be an outer threaded finish section, which can be delimited toward a bottom thereof by a collar or the like. The threaded finish section can be preserved during blow molding of the preform where the finish can form a thread for a screw cap of a finished beverage container, for example. The remaining portion of the preform, in contrast, can be deformed and stretched during the blow molding process. Preforms can be heated to predefined temperatures in order to enable blow molding in the desired manner. Heating can be performed by various means, including infrared radiation using an infrared oven, to effect defined and uniform temperature control of the preforms.

In particular, the polymeric material of the preform (e.g., PET) can be of such a nature that the polymer can strain harden as the polymer is stretched. The forming temperature employed during the blow molding process can therefore be a determinative factor in the resultant container. The strain hardening effect can be taken into consideration in the production of PET containers for the purpose of controlling and optimizing wall thickness distribution. Depending on the production process, it can be possible to apply heat via infrared radiation in such a way that the preforms are heated according to a temperature profile. In this manner, the warmer sections of the preform can be deformed with priority over other parts as long as is required for the stretching resistance resulting from strain hardening to become greater than the resistance of the adjacent cooler sections, for example. The temperature profile can be uniformly distributed around the circumference of the preforms and can vary, process-dependently, along the longitudinal axis of the preforms. In order to apply the desired temperature profile to the preforms, use of a number of heating zones can be employed, for instance up to nine or more zones. It is possible to control the plurality of different heating zones individually, whereby the selected setting is maintained constant over a longer period of operating the heating apparatus.

Preforms of different construction can require different heating regimens in preparation for blow molding into resultant containers. For example, preforms of different sizes, shapes, or thicknesses, which are formed of or including different polymers or polymer combinations, layers, and the like, can each have a predetermined temperature profile optimized for a particular blow molding process. Certain examples include different heating regimens for effecting different temperature profiles for PET preforms versus PP preforms. Other examples include different heating regimens for effecting the same temperature profile, but where the preforms have different characteristics that require different regimens to achieve the same temperature profile; e.g., preforms formed of the same material but having different thicknesses. Accordingly, various heating parameters can be tailored for particular preforms, including the number of heating zones, the temperature of certain heating zones, the exposure time to certain heating zones, and the like.

A blow molding system can often include a preform heating means in close proximity thereto, where heated preforms can be passed to a mold in short order and formed into resultant containers before a desired temperature profile of the preforms changes. A travel path of a preform through an infrared oven, for example, can be tailored to generate a predetermined temperature profile in a given preform. However, if a condition of the blow molding system and/or process is changed, it can be necessary to change the preform path or heating means to adapt to a new temperature profile for a given preform. Changes in blow molding conditions can include the use of another preform type, a change in the mold, changes in blow molding parameters, and the like. Accordingly, it can be difficult to adapt a blow molding system and/or process to changing conditions that require changes in preform temperature profiles while maintaining continuous or high throughput production of containers. Oftentimes, one or more settings may need to be changed, one or more new equilibriums reached, and one or more physical parameters may need to be adapted in the blow molding system in order to accommodate preforms having different characteristics.

In consideration of these issues, the present technology provides adaptable heating mechanisms for providing different temperature profiles to different preforms, where the resulting blow molding operation can be maintained in a continuous or high throughput fashion.

SUMMARY

The present technology includes systems and processes that relate to producing a plurality of preform temperature profiles allowing blow molding of different preforms with a pressurized fluid.

Systems for producing a plurality of preform temperature profiles are provided that include a first heating means, a second heating means, and a first transfer means. The first heating means has a first preform path, where the first heating means is configured to impart a first temperature profile to a preform passing through the first preform path. The first heating means includes a first dispensing means configured to selectively dispense the preform passing through at least a portion of the first preform path. The second heating means has a second preform path, where the second heating means is configured to impart a second temperature profile to a preform passing through the second preform path. The second heating means includes a second dispensing means configured to selectively dispense the preform passing through at least a portion of the second preform path. The first transfer means is configured to selectively transfer a preform between the first preform path of the first heating means and the second preform path of the second heating means.

Various ways of using systems for producing a plurality of preform temperature profiles are provided. Methods can include transferring a preform between the first preform path of the first heating means and the second preform path of the second heating means using the first transfer means. Methods can also include dispensing a first preform passing through at least a portion of the first preform path at a first temperature profile and dispensing a second preform passing through at least a portion of the second preform path at a second temperature profile.

Systems for blow molding a container from a preform are provided that include a blow molding system and a system for producing a plurality of preform temperature profiles. The blow molding system can include a mold configured to receive a preform and a means for delivering a pressurized fluid to a preform received in the mold to expand the preform into a container conforming to an interior surface of the mold. The system for producing a plurality of preform temperature profiles can include a first heating means, a second heating means, and a first transfer means, as described, where the first dispensing means is configured to selectively dispense the preform passing through at least a portion of the first preform path to the mold of the blow molding system and the second dispensing means is configured to selectively dispense the preform passing through at least a portion of the second preform path to the mold of the blow molding system.

Various ways of using systems for blow molding a container from a preform are provided. Methods can include transferring a preform between the first preform path of the first heating means and the second preform path of the second heating means using the first transfer means. Methods can also include dispensing a first preform passing through at least a portion of the first preform path at a first temperature profile and dispensing a second preform passing through at least a portion of the second preform path at a second temperature profile. One or more preforms dispensed from the first heating means and/or the second heating means can each be sequentially received by the mold where the pressurized fluid is delivered thereto to expand the preform into a container conforming to an interior surface of the mold.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings, where applicable.

DETAILED DESCRIPTION

Figure 1:
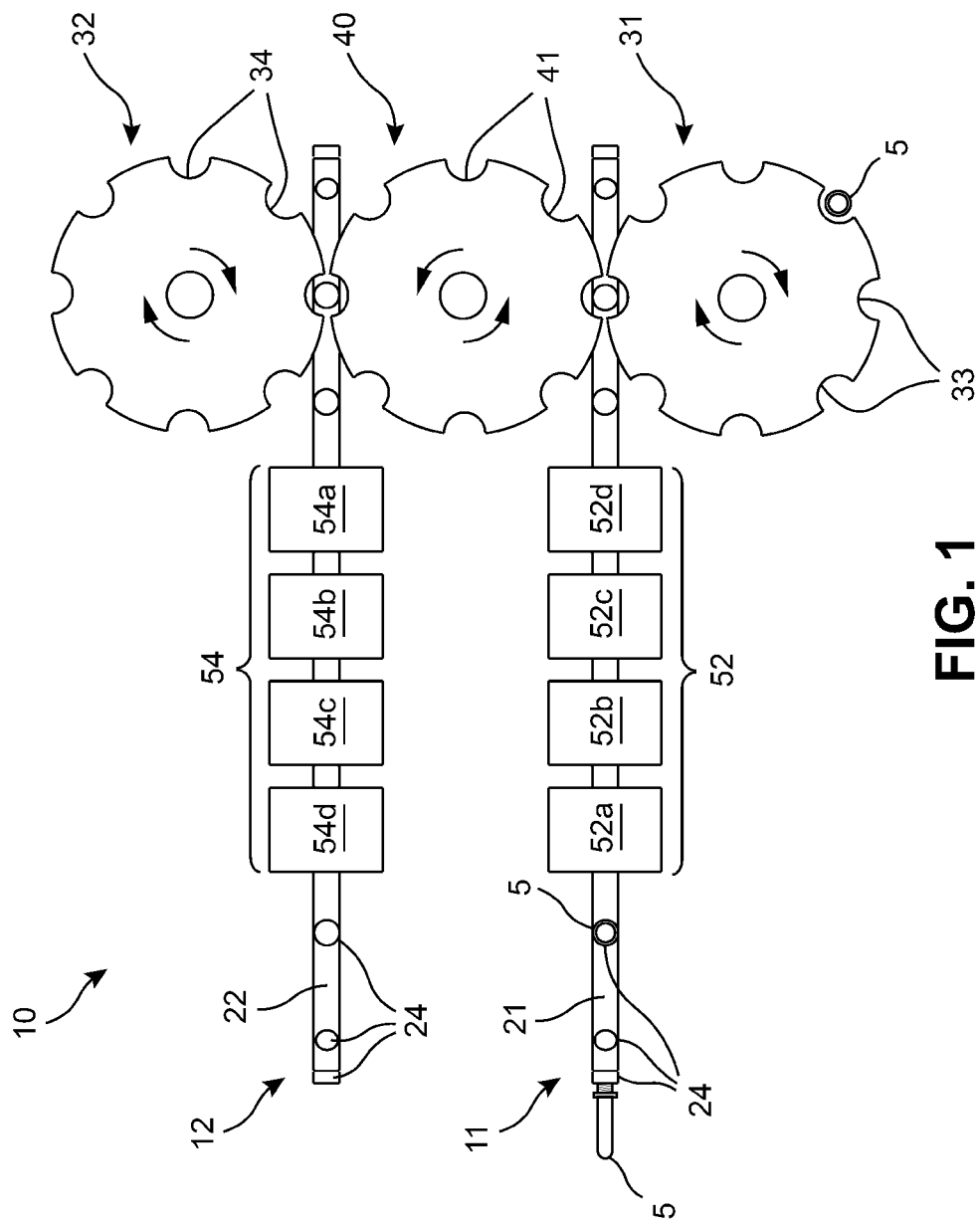
FIG. 1 is a partially schematic top plan view depicting an embodiment of a system for heating preforms according to an embodiment of the present invention.

The following description of technology is merely exemplary in nature of the subject matter, manufacture and use of one or more inventions, and is not intended to limit the scope, application, or uses of any specific invention claimed in this application or in such other applications as can be filed claiming priority to this application, or patents issuing therefrom. Regarding methods disclosed, the order of the steps presented is exemplary in nature, and thus, the order of the steps can be different in various embodiments, including where certain steps can be simultaneously performed. "A" and "an" as used herein indicate "at least one" of the item is present; a plurality of such items can be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that can arise from ordinary methods of measuring or using such parameters.

All documents, including patents, patent applications, and scientific literature cited in this detailed description are incorporated herein by reference, unless otherwise expressly indicated. Where any conflict or ambiguity can exist between a document incorporated by reference and this detailed description, the present detailed description controls.

Although the open-ended term "comprising," as a synonym of non-restrictive terms such as including, containing, or having, is used herein to describe and claim embodiments of the present technology, embodiments can alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that can be recited in the art, even though element D is not explicitly described as being excluded herein.

As referred to herein, disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter can define endpoints for a range of values that can be claimed for the parameter. For example, if Parameter X is exemplified herein to have value A and also exemplified to have value Z, it is envisioned that Parameter X can have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X can have other ranges of values including 1-9, 1-8, 1-3, 1-2, 2-10, 2-8, 2-3, 3-10, 3-9, and so on.

When an element or layer is referred to as being "on," "engaged to," "connected to," or "coupled to" another element or layer, it can be directly on, engaged, connected or coupled to the other element or layer, or intervening elements or layers can be present. In contrast, when an element is referred to as being "directly on," "directly engaged to," "directly connected to" or "directly coupled to" another element or layer, there can be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. can be used herein to describe various elements, components, regions, layers and/or sections, these elements, components, regions, layers and/or sections should not be limited by these terms. These terms can be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, can be used herein for ease of description to describe one element or feature's relationship to another element(s) or feature(s) as illustrated in the figures. Spatially relative terms can be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device can be otherwise oriented (rotated 90 degrees or at other orientations) and the spatially relative descriptors used herein interpreted accordingly.

The present technology is drawn to systems for producing a plurality of preform temperature profiles and ways of using such systems, especially in blow molding a container from a preform. Systems can include a plurality of heating means, including a first heating means and a second heating means, along with one or more transfer means, such as a first transfer means. The first heating means can have a first preform path and can be configured to impart a first temperature profile to a preform passing through the first preform path. The first heating means can include a first dispensing means configured to selectively dispense the preform passing through at least a portion of the first preform path. The second heating means can have a second preform path and can be configured to impart a second temperature profile to a preform passing through the second preform path. The second heating means can include a second dispensing means configured to selectively dispense the preform passing through at least a portion of the second preform path. The first transfer means can be configured to selectively transfer a preform between the first preform path of the first heating means and the second preform path of the second heating means.

The various heating means employed in the system can include the following aspects. The first heating means can include a first infrared oven, the second heating means can include a second infrared oven, or the first heating means and the second heating means can each include an infrared oven. Other heating modules or ovens can be used, including various ways of providing thermal energy to a preform. Direct and/or indirect (e.g., reflected) thermal energy can be applied by the heating means. Multidirectional application of thermal energy can be used as well as where preforms themselves are moved, spun, or rotated about various thermal radiation sources in the various heating means.

In certain embodiments, one or more of the heating means provided herein can include aspects of the "Oven for the thermal conditioning of preforms and control method of an air cooling device fitted to such an oven," as provided by U.S. Pat. No. 10,493,686 B2 to Derrien, issued Dec. 3, 2019, which is incorporated herein by reference. For example, one or more of the heating means provided herein can include ovens as described by U.S. Pat. No. 10,493,686 B2 to Derrien, and can include where such ovens are juxtaposed relative to each other and coupled by transfer means configured to selectively transfer a preform therebetween. Certain space-saving embodiments of the present technology include multiple heating means vertically arranged (e.g., stacked atop each other) that can take the form of stacked ovens, each oven generally configured as per U.S. Pat. No. 10,493,686 B2 to Derrien, where transfer means are located between successively stacked ovens.

The various dispensing means employed in the system can include the following aspects. The first dispensing means can include a first transfer wheel, the second dispensing means can include a second transfer wheel, or the first dispensing means and the second dispensing means can each include a transfer wheel. Such dispensing means can dispense heated preforms, including multiple preforms heated to different temperature profiles, to one or more molds where the preforms can be blow molded into containers. The dispensing means can include or work in conjunction with various types of conveyors or preform handling equipment to offload heated preforms from the various heating means to other equipment and/or directly to one or more blow molding molds.

The various transfer means employed in the system can include the following aspects. The first transfer means can include a transfer wheel, where the transfer wheel can selectively transfer a preform between the first preform path of the first heating means and the second preform path of the second heating means. For example, certain preforms can pass through the first preform path to achieve a certain temperature profile where they are dispensed therefrom, while other preforms can be transferred from the first preform path to the second preform path, or vice versa, so that such preforms experience heating by the first and second heating means to achieve another temperature profile prior to dispensing from the first or second heating means. It is also possible to have different lengths for the first preform path and the second preform path so that preforms traveling therethrough experience different temperature profiles. Preforms can also be transferred multiple times between the various heating means by the transfer means. As such, the lengths of various preform paths associated with various heating means, the characteristics of thermal energy applied by the various heating means, the time spent within the various heating means, can in each combination provide preforms having a plurality of temperature profiles.

Systems can include one or more preform loaders. For example, each heating means can be configured with a preform loader configured to deliver unheated preforms thereto or only certain heating means can be configured with a respective preform loader, as it is possible to use one or more transfer means to selectively transfer preforms therebetween. In certain embodiments, a first preform loader can be configured to deliver unheated preforms to the first heating means and/or a second preform loader can be configured to deliver unheated preforms to the second heating means. Different types of preforms can be delivered to the system via the different preform loaders and/or substantially similar preforms can be delivered to different heating means to effect different temperature profiles for different molds, pressurized fluids, and/or blow molding conditions.

As noted, systems provided herein can further comprise additional heating means. A third heating means having a third preform path can be provided in particular embodiments, where the third heating means can be configured to impart a third temperature profile to a preform passing through the third preform path. The third heating means can also include a third dispensing means configured to selectively dispense the preform passing through at least a portion of the third preform path. A second transfer means can be included that is configured to selectively transfer a preform between the second preform path of the second heating means and the third preform path of the third heating means. It is therefore possible in certain embodiments to subject a particular preform to travel through at least a portion of the first preform path, at least a portion of the second preform path, and at least a portion of the third preform path. A third preform loader can be included that is configured to deliver unheated preforms to the third heating means.

The systems described herein can be used in various ways to produce one or more preform temperature profiles for one or more preforms, including where the preforms are subjected to blow molding operations. For example, methods of using such systems can include transferring a preform between the first preform path of the first heating means and the second preform path of the second heating means using the first transfer means. It is also possible that such methods can include dispensing a first preform passing through at least a portion of the first preform path at a first temperature profile and/or dispensing a second preform passing through at least a portion of the second preform path at a second temperature profile. In this way, systems as described can be used to produce a plurality of preform temperature profiles.

System for blow molding a container from a preform are provided that include a blow molding system in addition to the system for producing a plurality of preform temperature profiles. In particular, the blow molding system can include a mold configured to receive a preform and a means for delivering a pressurized fluid to a preform received in the mold to expand the preform into a container conforming to an interior surface of the mold. The pressurized fluid can be a gas (e.g., air) or can be a liquid (e.g., a product intended to remain within the resultant container). The system for producing a plurality of preform temperature profiles can have the first dispensing means configured to selectively dispense a preform passing through at least a portion of the first preform path to the mold of the blow molding system and can have the second dispensing means configured to selectively dispense a preform passing through at least a portion of the second preform path to the mold of the blow molding system. Various ways of using the blow molding system are hence possible. The present technology further contemplates sequential production of various containers derived from preforms heated to different temperature profiles, including preforms of different construction that require different heating regimens in preparation for blow molding into resultant containers; e.g., preforms of different sizes, shapes, or thicknesses, which are formed of or including different polymers or polymer combinations, layers, etc.

Benefits and advantages of the present technology can include the following aspects. Juxtaposition and stacking of multiple heating means (e.g., vertically stacked ovens) can provide heated preforms via a compact system having a smaller footprint where a reduced floor space is necessitated relative to other systems. The ability to transfer a preform between multiple heating means can increase thermal energy absorption time for certain preform types; e.g., non-PET preforms versus PET preforms. Selective transfer of preforms and controlled dispensing between and from the multiple heating means provides unique ways to handle different preforms and allows flexible stock-keeping unit (SKU) management. For example, the system can include one or more bar code readers to track loading positions of preforms as they enter the system from one or more loaders and are subjected to certain travels through pathways including portions of one or more heating means. The ability to flexibly treat a mix of multiple types of preforms further allows blow molding to be maintained in a continuous or high throughput fashion.

Various types of blow molding operations can be employed. Blow molding can include injection blow molding where the precursor includes a preform. The blow molding operation can optionally include longitudinal stretching of the preform; e.g., injection stretch blow molding using a stretch rod to longitudinally extend the preform prior to or concomitant with expansion of the preform by a pressurized fluid to conform to a container mold. Blow molding can include injection of a gas into the preform to inflate the preform or injection of a liquid product to expand the preform, where the liquid product can remain within the container as an end product. The present technology also includes various systems and system components having the features provided herein. Various articles of manufacture are provided by the present technology, including various products-by-process.

It is understood that the present technology can be used in conjunction with other container manufacturing methods and can be used with various preform and precursor and container materials including, for example, thermoplastic, high density polyethylene, polypropylene, polyethylene naphthalate (PEN), a PET/PEN blend or copolymer, and various multilayer structures may be suitable for the manufacture of plastic containers and used in connection with the principles described herein. While the present disclosure contemplates the production of PET containers, it is understood that other polyolefin materials (e.g., polyethylene, polypropylene, polyester, etc.) as well as a number of other plastics can be processed using the present technology.

EXAMPLES

Figure 2:
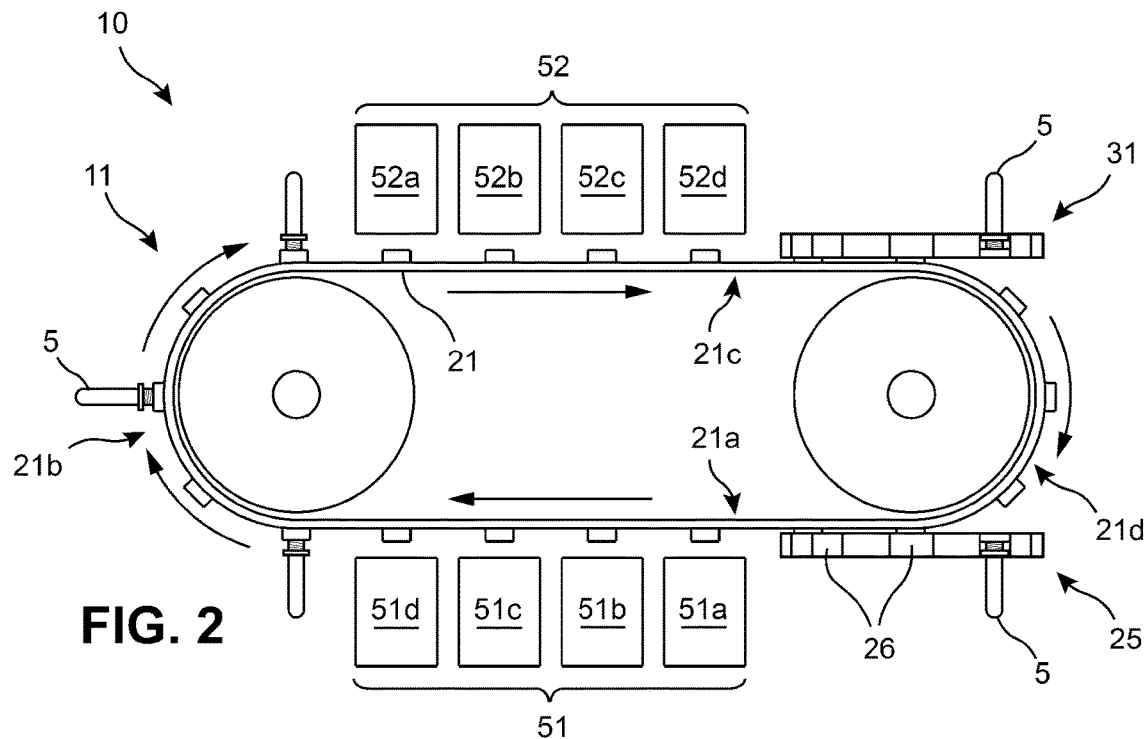
FIG. 2 is a partially schematic front elevational view of the system for heating preforms of FIG. 1.
Figure 3:
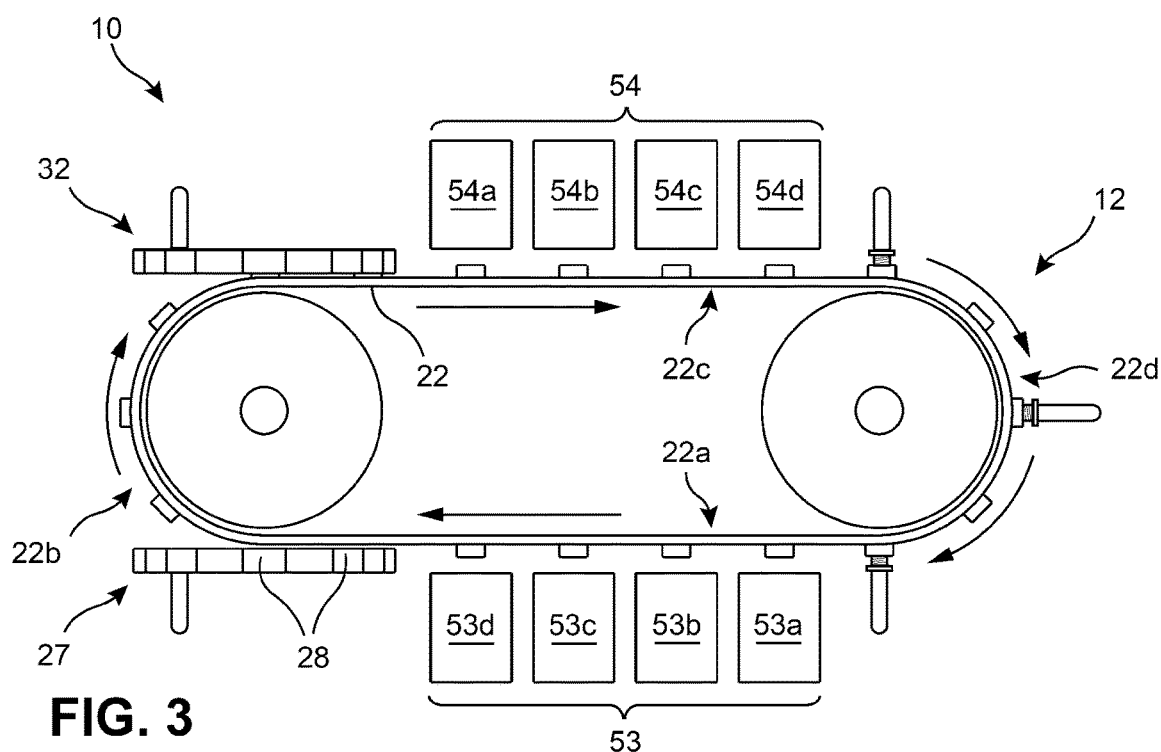
FIG. 3 is a partially schematic rear elevational view of the system for heating preforms of FIG. 1.

With reference to FIGS. 1-3, a preform heating system 10 for producing a plurality of preform temperature profiles is disclosed according to an embodiment of the present invention. The system 10 is shown as being used for heating preforms 5 having a threaded neck, a collar, and closed portion depending from the collar, but the system 10 may be configured for use with any of a plurality of different configurations of preforms while remaining within the scope of the present invention.

The preform heating system 10 includes a first heating means 11 and a second heating means 12. The first heating means 11 defines a first preform path along which each of the preforms 5 may be selectively transported during operation of the system 10 and the second heating means 12 defines a second preform path along which each of the preforms 5 may be selectively transported during operation of the system 10. In the provided example, the first preform path is defined by a first transport system 21 and the second preform path is defined by a second transport system 22.

Each of the transport systems 21, 22 may be representative of a conveyer system having an element such as a link chain or conveyer belt that is formed into a closed loop, wherein each of the transport systems 21, 22 may be looped around at least two wheels driving the motion of the transport systems 21, 22. In some embodiments, each of the transport systems 21, 22 may be driven by a common drive component, as desired. The common drive component may be configured to drive the transport systems 21, 22 in common directions or in opposing directions, and may also be configured to drive the transport systems 21, 22 at different rates. Each of the transport systems 21, 22 may be associated with suitable structure for achieving a desired transport speed and desired transport direction for each of the respective transport systems 21, 22.

Each of the transport systems 21, 22 further includes a plurality of spaced apart gripping means 24, wherein each of the gripping means 24 is configured to hold one of the preforms 5 at a desired configuration during transport of the preform 5 about the corresponding transport system 21, 22. As shown in the figures, the gripping means 24 may be configured to grasp a portion of each of the preforms 5 formed to a side of the collar thereof having the threaded finish, thereby allowing for the closed portion of each of the preforms 5 to extend away from the collar and the gripping means 24 for heating by a respective one of the heating means 11, 12. The gripping means 24 may be further configured to selective reorient or reposition each of the preforms 5 as the preforms 5 pass through the respective heating means 11, 12, as desired.

The first transport system 21 is shown as forming a closed loop shape including a first linear segment 21a, a first reversal segment 21b, a second linear segment 21c, and a second reversal segment 21d. The second transport system 22 is similarly shown as forming a closed loop shape including a first linear segment 22a, a first reversal segment 22b, a second linear segment 22c, and a second reversal segment 22d. As shown by the arrows in FIGS. 2 and 3, each of the reversal segments 21b, 21d, 22b, 22d forms a portion of the respective transport system 21, 22 wherein a direction of travel of each of the preforms 5 is reversed. As such, each of the preforms 5 is configured to travel along the first linear segment 21a, 22a of each of the respective transport systems 21, 22 in a direction opposite to a direction each of the preforms 5 is configured to travel along the second linear segment 21c, 22c of each of corresponding transport systems 21, 22. A reversal in a direction of travel of each of the preforms 5 may also correspond to a reversal of an orientation of each of the preforms 5, such as inverting each of the preforms 5 from a downwardly depending configuration to an upwardly extending configuration, as shown in FIGS. 2 and 3.

The first heating means 11 may comprise at least one infrared oven for imparting the first temperature profile into each of the preforms 5 passing at least partially along the first perform path as defined by the first transport system 21. In the illustrated embodiment, the at least one infrared oven includes a first bank 51 of ovens spaced apart from each other along the first linear segment 21a of the first transport system 21 and a second bank 52 of ovens spaced apart from each other along the second linear segment 21c of the first transport system 21. The first bank 51 of ovens includes a first oven 51a, a second oven 51b, a third oven 51c, and a fourth oven 51d disposed, in order, in the direction of travel of the preforms 5 along the first linear segment 21a. The second bank 52 of ovens includes a first oven 52a, a second oven 52b, a third oven 52c, and a fourth oven 52d disposed, in order, in the direction of travel of the preforms 5 along the second linear segment 21c. However, each of the banks 51, 52 of ovens may include any number of the ovens, as desired, for imparting the desired first temperature profile into each of the preforms 5 passing along at least a portion of the first preform path defined by the first transport system 21.

The second heating means 12 may similarly comprise at least one infrared oven for imparting the second temperature profile into each of the preforms 5 passing at least partially along the second perform path as defined by the second transport system 22. In the illustrated embodiment, the at least one infrared oven includes a first bank 53 of ovens spaced apart from each other along the first linear segment 22a of the second transport system 22 and a second bank 54 of ovens spaced apart from each other along the second linear segment 22c of the second transport system 22. The first bank 53 of ovens includes a first oven 53a, a second oven 53b, a third oven 53c, and a fourth oven 53d disposed, in order, in the direction of travel of the preforms 5 along the first linear segment 22a. The second bank 54 of ovens includes a first oven 54a, a second oven 54b, a third oven 54c, and a fourth oven 54d disposed, in order, in the direction of travel of the preforms 5 along the second linear segment 22c. However, each of the banks 53, 54 of ovens may include any number of the ovens, as desired, for imparting the desired second temperature profile into each of the preforms 5 passing along at least a portion of the second preform path defined by the second transport system 22.

As shown in FIG. 2, a first preform loader 25 may be configured to deliver one of the unheated preforms 5 to the first heating means 11 via a transfer of the preform 5 from the first preform loader 25 to the first transport system 21 of the first heating means 11. More specifically, the first preform loader 25 may be configured to deliver one of the preforms 5 to an upstream end of the first linear segment 21a of the first transport system 21 formed at an intersection of the first linear segment 21a and the second reversal segment 21d thereof.

The first preform loader 25 may include at least one gripping means 26 configured to grasp each of the preforms 5 when delivering the performs 5 to the first transport system 21, and the transfer may occur between one of the gripping means 26 of the first preform loader 25 and one of the gripping means 24 of the first transport system 21. The gripping means 24 of the first transport system 21 and the gripping means 26 of the first preform loader 25 may include complimentary structures for performing the transfer of the preforms 5 therebetween.

In the provided embodiment, the first preform loader 25 is shown as a transfer wheel configured to rotate about a rotational axis thereof, wherein the gripping means 26 are distributed about a periphery of the transfer wheel. However, the first preform loader 25 may be formed from any mechanism or device having the structure necessary for delivering the preforms 5 to the first transport system 21, such as a robotic arm, conveyer system, rail system, or the like, without departing from the scope of the present invention. The first preform loader 25 may also be representative of a plurality of components or mechanisms operating in conjunction with each other to deliver the preforms 5 to the first heating means 11, as desired.

As shown in FIG. 3, a second preform loader 27 may similarly be configured to deliver one of the unheated preforms 5 to the second heating means 12 via a transfer of the preform 5 from the second preform loader 27 to the second transport system 22 of the second heating means 11. More specifically, the second preform loader 27 may be configured to deliver one of the preforms 5 to a downstream end of the first linear segment 22a of the second transport system 22 formed at an intersection of the first linear segment 22a and the first reversal segment 22b thereof.

The second preform loader 27 may include at least one gripping means 28 configured to grasp each of the preforms 5 when delivering the performs 5 to the second transport system 22, and the transfer may occur between one of the gripping means 28 of the second preform loader 27 and one of the gripping means 24 of the second transport system 22. The gripping means 24 of the second transport system 22 and the gripping means 28 of the second preform loader 27 may include complimentary structures for performing the transfer of the preforms 5 therebetween.

In the provided embodiment, the second preform loader 27 is also shown as a transfer wheel configured to rotate about a rotational axis thereof, wherein the gripping means 28 are distributed about a periphery of the transfer wheel. However, the second preform loader 27 may be formed from any mechanism or device having the structure necessary for delivering the preforms 5 to the second transport system 22, such as a robotic arm, conveyer system, rail system, or the like, without departing from the scope of the present invention. The second preform loader 27 may also be representative of a plurality of components or mechanisms operating in conjunction with each other to deliver the preforms 5 to the second heating means 12, as desired.

As shown in FIG. 1, the system 10 may further include at least one transfer means 40 for selectively transferring one of the preforms 5 between the first preform path of the first heating means 11 and the second preform path of the second heating means 12. Each of the at least one transfer means 40 may include at least one gripping means 41 configured to grasp each of the preforms 5 when transferring the preforms 5 between the first and second preform paths as formed by the first and second transport systems 21, 22. The gripping means 41 of the at least one transfer means 40 may include structure complimentary to the gripping means 24 of each of the first transport system 21 and the second transport system 22 to facilitate the handing-off of the preforms 5 therebetween.

In the provided embodiment, the at least one transfer means 40 is presented as a single transfer wheel configured to rotate about a rotational axis thereof, wherein the gripping means 41 are distributed about a periphery of the transfer wheel. However, the transfer means 40 may be formed from any mechanism or device having the structure necessary for transferring the preforms 5 between the first and second transport systems 21, 22, such as a robotic arm, conveyer system, rail system, or the like, without departing from the scope of the present invention. The transfer means 40 may also be representative of a plurality of components or mechanisms operating in conjunction with each other to transfer the preforms 5, as desired.

In the provided embodiment, the transfer means 40 is shown as transferring the preforms 5 between a downstream end of the second linear segment 21c of the first transport system 21 and an upstream end of the second linear segment 22c of the second transport system 22. However, as explained in greater detail hereinafter with reference to FIG. 4, each of the at least one transfer means 40 may be configured to transfer the preforms 5 between any position of the first preform path and any position of the second preform path, as desired, while remaining within the scope of the present invention.

The system 10 includes a first dispensing means 31 configured to dispense a heated preform from the first preform path as defined by the first transport system 21. Each of the preforms 5 dispensed by the first dispensing means 31 may be dispensed to a mold station wherein a blow molding operation occurs, as explained in greater detail with reference to FIG. 4. The first dispensing means 31 is shown as a transfer wheel having at least one gripping means 33 distributed about a periphery thereof. Each of the gripping means 33 may be configured to grasp each of the preforms 5 when dispensing the preforms 5 from the first preform path as formed by the first transport systems 21. The gripping means 33 of the first dispensing means 31 may include structure complimentary to the gripping means 24 of the first transport system 21 to facilitate the transfer of the preforms 5 therebetween.

In the provided embodiment, the first dispensing means 31 is configured to dispense the heated preforms from the first preform path at a downstream end of the second linear segment 21c of the first transport system 21. However, as explained with reference to FIG. 4, the first dispensing means 31 may be configured to dispense the heated preforms from any position on the first preform path, as desired, while remaining within the scope of the present invention.

The system 10 further includes a second dispensing means 32 configured to dispense a heated preform from the second preform path as defined by the second transport system 22. Each of the preforms 5 dispensed by the second dispensing means 32 may be dispensed to a mold station wherein a blow molding operation occurs, as explained in greater detail with reference to FIG. 4. The second dispensing means 32 is shown as a transfer wheel having at least one gripping means 34 distributed about a periphery thereof. Each of the gripping means 34 may be configured to grasp each of the preforms 5 when dispensing the preforms 5 from the second preform path as formed by the second transport systems 22. The gripping means 34 of the second dispensing means 32 may include structure complimentary to the gripping means 24 of the second transport system 22 to facilitate the transfer of the preforms 5 therebetween.

In the provided embodiment, the second dispensing means 32 is configured to dispense the heated preforms from the second preform path at an upstream end of the second linear segment 22c of the second transport system 22. However, as explained with reference to FIG. 4, the second dispensing means 32 may be configured to dispense the heated preforms from any position on the second preform path, as desired, while remaining within the scope of the present invention.

In operation, the preforms 5 may be loaded to the first heating means 11 via a transfer of the preforms 5 from the first preform loader 25 to the first transport system 21. The preforms 5 may then traverse at least a portion of the first preform path where the preforms 5 are heated by the first heating means 11. The preforms 5 may then be selectively dispensed by the first dispensing means 31 or the preforms 5 may be rerouted to the second preform path via the at least one transfer means 40. Those preforms 5 transferred from the first preform path to the second preform path may traverse at least a portion of the second preform path where the preforms 5 are heated by the second heating means 12. The preforms 5 transferred to the second preform path may be selectively dispensed therefrom via the second dispensing means 32, or may be returned to the first preform path via the at least one transfer means 40.

The preforms 5 may also be introduced and loaded to the second heating means 12 via transfer of the preforms 5 from the second preform loader 27 to the second transport system 22. These preforms 5 may be passed through at least a portion of the second preform path before either being dispensed by the second dispensing means 32 or transferred to the first preform path by the at least one transfer means 40.

The disclosed configuration of the system 10 accordingly allows for the preforms 5 to be introduced via either of the preform loaders 25, 27, to be selectively passed through at least a portion of one or both of the heating means 11, 12, and to be dispensed from either of the dispensing means 31, 32 when a desired temperature profile of each of the preforms 5 has been reached.

Figure 4:
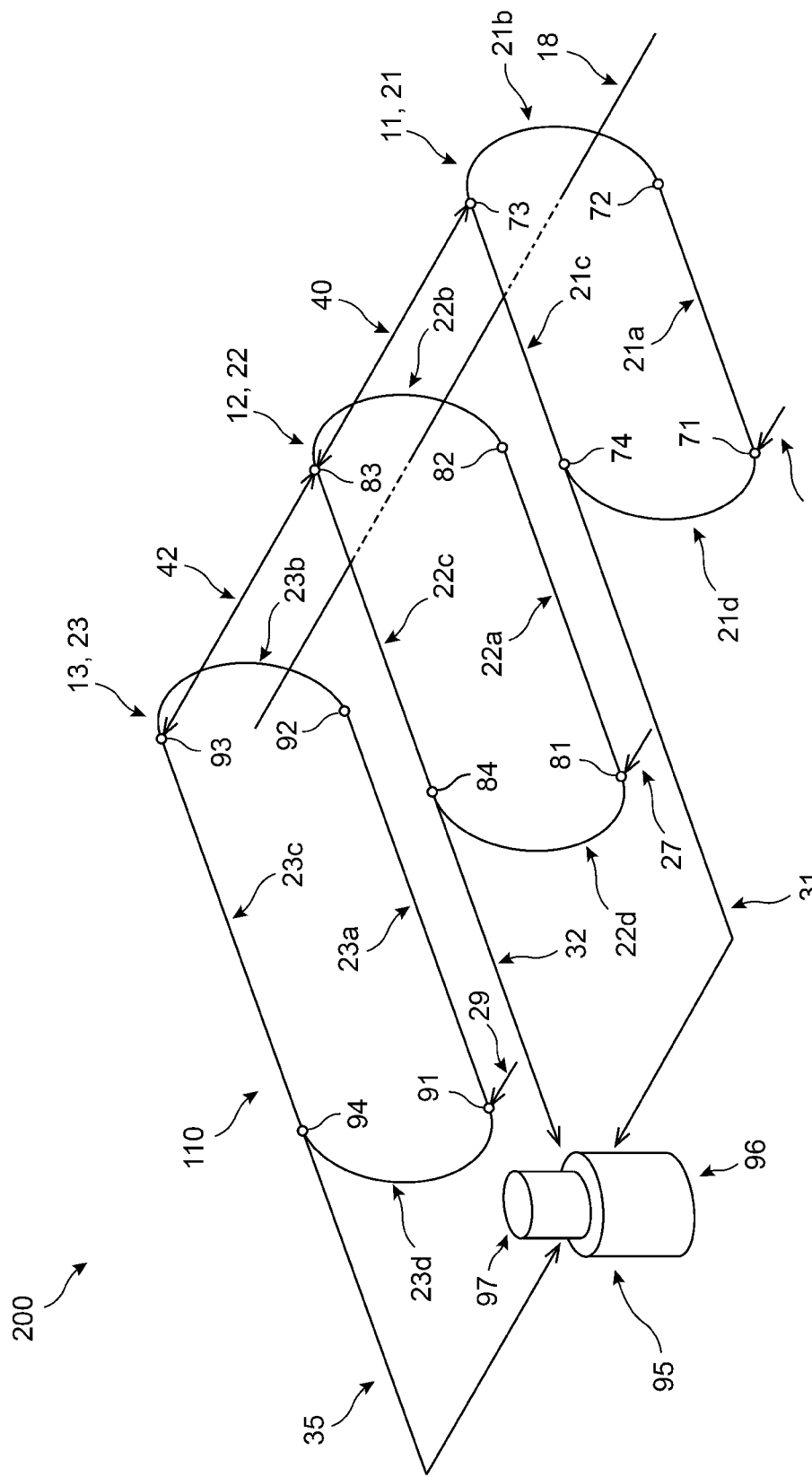
FIG. 4 is a schematic depiction of a system for blow molding a container from a heated preform according to an embodiment of the present invention.

Referring now to FIG. 4, a system 200 for blow molding a container from a heated preform is schematically disclosed according to an embodiment of the present invention. The system 200 includes a modified preform heating system 110 and a blow molding system 95. The preform heating system 110 is substantially similar to the preform heating system 10, except the preform heating system 110 includes a third heating means 13 in addition to the previously disclosed first and second heating means 11, 12. A third transport system 23 of the third heating means 13 defines a third preform path along which a preform may attain a third temperature profile after traversing at least a portion of the third preform path. The third transport system 23 is shown as including a first linear segment 23a, a first reversal segment 23b, a second linear segment 23c, and a second reversal segment 23d for forming a closed loop shape.

The third heating means 13 may include at least one infrared oven disposed along one or both of the linear segments 23a, 23c thereof. Specifically, the third heating means 13 may include a first bank of the ovens along the first linear segment 23a and a second bank of the ovens along the second linear segment 23c, wherein each of the banks may include a similar configuration to the banks 51, 52, 53, 54 disclosed with regards to the first and second heating means 11, 12.

The first preform loader 25 is configured to load the preforms to the first heating means 11, the second preform loader 27 is configured to load the preforms to the second heating means 12, and a third preform loader 29 is configured to load the preforms to the third heating means 13. The third preform loader 29 may be a transfer wheel having similar structure to the preform loaders 25, 27. The first transfer means 40 is configured to transfer the preforms between the first heating means 11 and the second heating means 12 while a second transfer means 42 is configured to transfer the preforms between the second heating means 12 and the third heating means 13. The first dispensing means 31 is configured to dispense the preforms from the first heating means 11 to the mold station 95, the second dispensing means 32 is configured to dispense the preforms from the second heating means 12 to the mold station 95, and a third dispensing means 35 is configured to dispense the preforms from the third heating means 13 to the mold station 95. The third dispensing means 35 may include a transfer wheel in similar fashion to the dispensing means 31, 32.

The blow molding system 95 includes at least one mold 96 configured to receive a preform and at least one means 97 for delivering a pressurized fluid to a preform received in the at least one mold 96 to expand the preform into a container conforming to an interior surface of the at least one mold 96. The blow molding system 95 may be configured to receive preforms that have been dispensed from any of the heating means 11, 12, 13.

The first transport system 21 is shown as including a plurality of nodes 71, 72, 73, 74. The nodes 71, 72 are formed at opposing ends of the first linear segment 21a and the nodes 73, 74 are formed at opposing ends of the second linear segment 21c. The second transport system 22 is shown as similarly including a plurality of nodes 81, 82, 83, 84. The nodes 81, 82 are formed at opposing ends of the first linear segment 22a and the nodes 83, 84 are formed at opposing ends of the second linear segment 22c. Lastly, the third transport system 23 is shown as similarly including a plurality of nodes 91, 92, 93, 94. The nodes 91, 92 are formed at opposing ends of the first linear segment 23a and the nodes 93, 94 are formed at opposing ends of the second linear segment 23c.

Each of the nodes 71, 72, 73, 74, 81, 82, 83, 84, 91, 92, 93, 94 depicted in FIG. 4 corresponds to a possible position at which one of the preforms may be loaded to one of the heating means 11, 12, 13, transferred away from or to one of the heating means 11, 12, 13, and/or dispensed from one of the heating means 11, 12, 13. As such, the specific configuration of the preform loaders 25, 27, 29, the transfer means 40, 42, and the dispensing means 31, 32, 35 as shown in FIG. 4 is non-limiting. The positions of such components may be varied to account for different temperature profiles that are to be imparted to the preforms.

The system 110 is also not limited to one loader 25, 27, 29, one transfer means 40, 42, or one dispensing means 31, 32, 35 associated with each of the heating means 11, 12, 13. Each of the heating means 11, 12, 13 may be associated with as many of the components as necessary to establish a desired pathway for each of the preforms, which may involve traversing portions of multiple different heating means 11, 12, 13 before being dispensed to the blow molding system 95.

The system 110 is also shown in FIG. 4 as including different lengths of the linear segments 21a, 21c, 22a, 22c, 23a, 23c of the different transport systems 21, 22, 23. These different lengths may be representative of each of the heating means 11, 12, 13 having a different heating capacity. For example, assuming each of the ovens forming each of the corresponding banks of ovens includes substantially similar characteristics, the increased length of the linear segments 22a, 22c of the second transport system 22 in comparison to the linear segments 21a, 21c of the first transport system 21 may be associated with a greater number of the ovens forming each of the banks of the ovens along each of the linear segments 22a, 22c in comparison to the linear segments 21a, 21c. Similarly, the increased length of the linear segments 23a, 23c of the third transport system 23 in comparison to the linear segments 22a, 22c of the second transport system 22 may be associated with a greater number of the ovens forming each of the banks of the ovens along each of the linear segments 23a, 23c in comparison to the linear segments 22a, 22c. Such variations in the heating capacity of the different heating means 11, 12, 13 may be provided to account for preforms requiring different temperature profiles with respect to the different heating means 11, 12, 13.

Each of the transport systems 21, 22, 23 may also beneficially driven by a single drive shaft 18 operatively coupled to each of the respective transport systems 21, 22, 23, thereby simplifying the operation of the system 110.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments can be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions and methods can be made within the scope of the present technology, with substantially similar results.

What is claimed is:

1. A system for producing a plurality of preform temperature profiles, the system comprising:
a first heating means having a first preform path, the first preform path defined by a first transport system including a first conveyer element formed into a first closed loop, wherein the first heating means includes one or more first infrared ovens configured to impart a first temperature profile to a preform passing through at least a portion of the first preform path, the first heating means including a first dispensing means configured to selectively dispense the preform passing through at least a portion of the first preform path away from the first preform path and towards a blow molding system;
a second heating means having a second preform path, the second preform path defined by a second transport system including a second conveyer element formed into a second closed loop, wherein the second heating means includes one or more second infrared ovens configured to impart a second temperature profile to a preform passing through at least a portion of the second preform path with the second temperature profile different from the first temperature profile by way of one or both of a number of the first infrared ovens being different from a number of the second infrared ovens or a length of the first preform path being different from a length of the second preform path, the second heating means including a second dispensing means configured to selectively dispense the preform passing through at least a portion of the second preform path away from the second preform path and towards a blow molding system; and
a first transfer means configured to selectively transfer a preform between the first preform path of the first heating means and the second preform path of the second heating means one or more times such that the transferred preform is heated by each of the first heating means and the second heating means at least once before being dispensed towards the blow molding system, wherein a number of times the transferred preform is heated by each of the first heating means and the second heating means in combination is variably based upon characteristics of the transferred preform.

2. The system of claim 1, wherein the first dispensing means includes a first transfer wheel.

3. The system of claim 2, wherein the second dispensing means includes a second transfer wheel.

4. The system of claim 1, wherein the first transfer means includes a transfer wheel.

5. The system of claim 1, wherein a quantity of the second infrared ovens is greater than a quantity of the first infrared ovens.

6. The system of claim 1, wherein the second preform path is longer than the first preform path.

7. The system of claim 1, further comprising a first preform loader configured to deliver unheated preforms to the first heating means.

8. The system of claim 7, further comprising a second perform loader configured to deliver unheated preforms to the second heating means.

9. The system of claim 1, further comprising:
a third heating means having a third preform path, the third heating means configured to impart a third temperature profile to a preform passing through the third preform path, the third heating means including a third dispensing means configured to selectively dispense the preform passing through at least a portion of the third preform path; and
a second transfer means configured to selectively transfer a preform between the second preform path of the second heating means and the third preform path of the third heating means.

10. The system of claim 9, further comprising a first preform loader configured to deliver unheated preforms to the first heating means, a second perform loader configured to deliver unheated preforms to the second heating means, and a third preform loader configured to deliver unheated preforms to the third heating means.

\* \* \* \* \*